R. S. KENT.
APPARATUS FOR REVIVIFYING CHAR.
APPLICATION FILED JUNE 25, 1913.
1,207,178.
Patented Dec. 5, 1916.
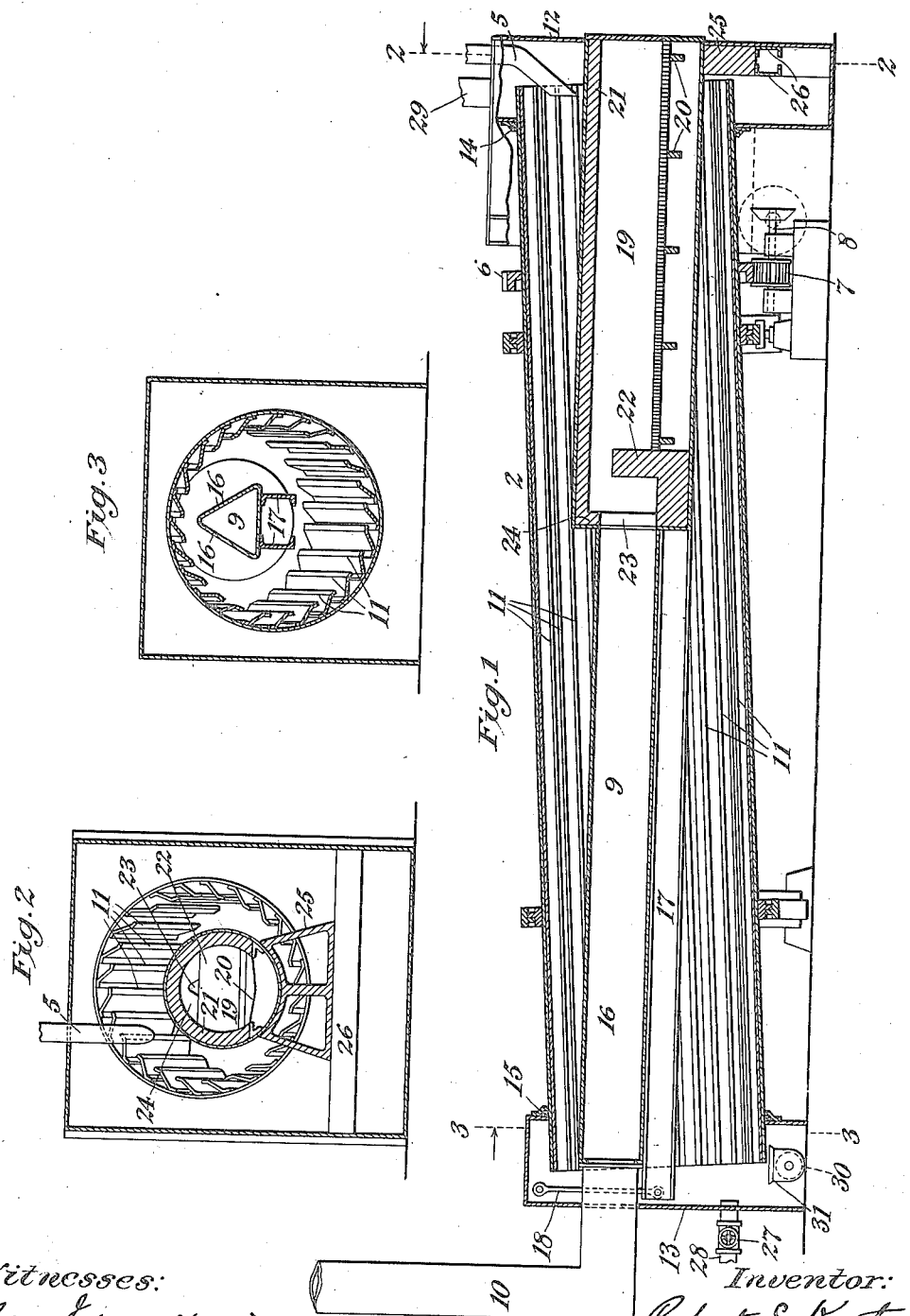
Witnesses:
Inventor:
Robert S. Kent
by
Attorney.

UNITED STATES PATENT OFFICE.

ROBERT S. KENT, OF BROOKLYN, NEW YORK.

APPARATUS FOR REVIVIFYING CHAR.

1,207,178.   Specification of Letters Patent.   Patented Dec. 5, 1916.

Application filed June 25, 1913. Serial No. 775,643.

*To all whom it may concern:*

Be it known that I, ROBERT S. KENT, a citizen of the United States, and a resident of Brooklyn, in the county of Kings and State of New York, have invented certain new and useful Improvements in Apparatus for Revivifying Char, of which the following is a specification.

This invention relates to an apparatus for revivifying char, and particularly to an apparatus for altering the carbon content of char that has been used repeatedly and has become either clogged with carbon and other foreign materials or impoverished to such an extent as to be unsuitable for further use for purifying saccharine and other solutions.

My present invention is in the nature of an improvement upon the apparatus heretofore used for carrying out the Weinrich process of revivifying char or bone-black set forth, for example, in Patent No. 586,278, granted July 13, 1897, and the principal object of the invention is to provide an apparatus by means of which the char to be treated may be more perfectly exposed to the action of a gaseous medium for altering the carbon content thereof and in which apparatus said gaseous medium and the parts of the apparatus through which it passes may be more economically heated than in apparatus heretofore employed for such purpose.

The principal feature of my present invention is the employment of a char-drying drum preferably so constructed as to permit the showering of the material under treatment in fine streams through the drum and heating means located wholly within the apparatus for heating up the drum and a current of air, carbon dioxid, or other gaseous medium passing through the drum to a point at which said medium will be effective to bring about the desired revivifying action and alter the carbon content of the char sufficiently to restore said char to a condition for reuse. As this process of revivifying char as practised for many years embraces both the destructive distillation of organic matter contained in the cell structure and upon the surface of each particle of char and also the addition of carbon to cell structures of particles of char weakened by the more or less rapid oxidation of portions of the carbon of such cells, the present invention is an apparatus adapted either to burn out superfluous carbon contained in the organic matter within and upon the surfaces of such cells, or to add carbon to such cell structures when necessary. This result will of course be obtained by supplying either atmospheric air or other oxygen-containing gaseous medium to the drum in which the char under treatment is contained, or by supplying a gaseous medium, such as carbon dioxid, to the char, which medium when dissociated under the action of the temperature present will of course deposit its carbon upon and within the cell structures of the particles. Of course the more completely the char is broken up and separated into its constituent particles, as by showering through a drum, the more readily will either the subtraction or the addition of carbon to such particles be accomplished.

The apparatus which I prefer to employ for carrying into effect my present invention for altering the carbon content of char is preferably a modification of the type of rotary drying apparatus disclosed in my prior Patent No. 914,052, granted March 2, 1902, and in my prior application No. 766,592, filed May 9, 1913, for drying materials, in each of which there is set forth a drying apparatus of the rotary drum type containing flights for showering the material through the drum during the rotation thereof, and in the latter of which there is disclosed a drum of this type heated by a furnace located within such drum.

Other features of the invention not hereinbefore referred to will be hereinafter described and claimed and are illustrated in the accompanying drawings, in which,—

Figure 1 is a substantially central, longitudinal section and side elevation of an internally heated drying apparatus for decarbonizing or recarbonizing char and embodying the present invention; Fig. 2 is a transverse section and front elevation of the same, the section being taken in line 2—2, Fig. 1, looking in the direction of the arrow, and Fig. 3 is a transverse section and rear elevation of the same, the section being taken in line 3—3, Fig. 1, looking in the opposite direction as indicated by the arrow.

Similar characters designate like parts in all the figures of the drawings.

In carrying my invention into effect I make use of a suitable drying apparatus capable of operation substantially in the manner before described, it being preferably of substantially the type illustrated in the drawings. The main elements of this apparatus are in most respects of well known construction except, of course, where modification was found necessary to adapt my present invention thereto. In these drawings 2 illustrates a drying chamber of a well known type in the form of a rotary char-conveying drum suitably supported at the proper points in its length in a well known manner on roller bearings. This drum is placed, as is usual, at a slight angle to the horizontal, for the purpose of assuring the movement of the material from the upper or receiving end to the lower or delivery end of the drum. At the receiving end the material may be introduced into the drum in any suitable manner, as for example, through a spout 5, projecting into the receiving end of the drum, preferably at a point at one side of the axis of the same. This spout may lead from any usual source of supply of moist char to be dried. Near one end thereof, in this case the receiving end, provision is made for continuously rotating the outer drying chamber or drum 2, the means shown for the purpose being the usual large external gear, 6, meshing with a driving pinion, 7, and suitably supported and carried by a driving shaft, 8.

In connection with the outer drying chamber or rotary drum 2 I prefer to employ as in my aforesaid application, an inner chamber or shell, for the purpose of circulating a heated gaseous drying medium, usually products of combustion from a furnace or other suitable source of heat, through the apparatus from one end to the other of the same. Such an inner drying chamber is shown at 9. Unlike the outer drum 2 it is illustrated as stationary and also as disposed substantially horizontally. At its forward end it is intended to be connected with suitable means for supplying the gaseous heating medium for circulation through the inner chamber 9 from the front to the rear thereof, from which products of combustion may be delivered through a flue, 10, to a stack (not shown) in a well known manner.

The drum 2 is so constructed as to be capable of raising and showering the moist char in a manner which is well understood, suitable char-conveying buckets or flights being shown at 11 for this purpose. These flights may be either straight-edge flights or saw-tooth flights of the type shown in my aforesaid patent. Near its ends the outer rotary drum 2 is preferably mounted, as usual, in suitable casing-heads, such as 12 and 13, which serve to cover the open ends of said drum and prevent waste of heat, etc. The head 13 is preferably movable to permit the drum to be shifted lengthwise relatively to the other parts in assembling and disassembling. Suitable joints properly packed will be employed, as indicated at 14 and 15, at the points where the rotary drum 2 passes into said casing-heads.

The inner drying chamber or flue 9 may be supported and mounted in substantially the manner disclosed in my aforesaid application, it being shown as stationary and as mounted on substantially stationary supporting means. Its cross-section is also preferably such as to facilitate the descent of the char being showered and to permit the char to fall to the bottom of the rotary drum 2. Here its cross-section is triangular, it being substantially that of an equilateral triangle with one vertex uppermost and its side walls, 16, sloping to such an extent as to prevent accumulation of the char thereon. The delivery end of this triangular pipe or chamber may be connected in any suitable way with the flue 10. There is of course no communication between the two chambers 2 and 9 as the latter is intended to carry products of combustion from the furnace which, of course, must be kept out of contact with the char being treated. At its forward end the stationary chamber or flue 9 is open to communication with the heating means. Here the chamber 9 is independently supported on one or more channel-beams, 17, which, in this construction, extend from the rear end of the heating means proper to the rear end of the apparatus, and each at its rear end is suspended from a hanger, 18, in the casing-head 13, it being not only supported by said hanger but so held as to be permitted to expand and contact longitudinally in accordance with changes in the temperature. At its forward end each channel-beam 17 is supported in a manner which will be hereinafter described.

One of the principal features of the apparatus is, as before stated, internal heating means for supplying to the interior of the apparatus sufficient heat for drying the char and also heating it up (both through contact with heated walls and with a heated gaseous medium) to a point where the temperature will be high enough to bring about the desired oxidizing or reducing action to change the carbon content of the char. The preferred construction is one in which the heating means or furnace is not only located within the outer drum in which the char is circulated during drying, but is also connected directly to the receiving end of the stationary inner drying chamber 9 as in my aforesaid application. A furnace suitable for the purpose is illustrated at 19. As shown it is a relatively long furnace, substantially circular in cross-section and of considerably smaller diameter than the outer rotary drum 2, in order that it may be located within said drum and yet leave sufficient space between it and the circuit of internal flights 11 in said drum to permit the proper showering of the material in the drum in the rotation of said flights, and also permit the proper circulation of a suitable heated gaseous medium lengthwise through the drum for drying and decarbonizing or recarbonizing the char. This furnace 19 has the usual grate, 20, and a suitable fire-brick lining, 21,—which also serves to prevent overheating of the surrounding space and the walls of the rotary drum 2—and is closed at its forward end by a door or doors (not shown) through which the furnace may be charged. Near its rear end it has a baffle-wall, 22, and at the extreme rear end thereof a delivery opening, 23, in the end wall, 24 (of metal and fire-brick) through which delivery opening the furnace gases are delivered and enter the forward or receiving end of the stationary inner drying chamber or flue 9, and passing through it heat up the walls of said chamber and emerge through the flue 10 leading to a stack. The furnace 19, like the inner drying chamber or flue 9, is also supported independently of the rotary drying chamber or drum 2, said furnace being in this construction supported directly on a hollow angle-iron support, 25, mounted on transverse channel-bars, 26, at the receiving end of the apparatus. At its rear end the furnace is secured to the channel-beams 17 the bottom edges of which are shown as on a level with the bottom of the furnace. These channel-beams support the flue 9 directly and the flue itself is also securely fastened to the rear end of said furnace.

The char to be treated is supplied, as before stated, through the pipe 5 and is delivered into the interior of the outer rotary drum 2 preferably at a point on one side of the center of the top of the furnace, so that as little as possible will lodge on top of the furnace, the incline of these walls being such that the material will flow downward. The moist material falls first to the bottom of the drum 2 and is caught by the flights 11 and carried around by them and showered through the space in said drum from a point near the top of the rotary drum. The construction of the flights is such that the char is preferably not spilled from them until said flights pass some distance beyond the central vertical plane of the furnace and drum, in order that the material may not lodge on top of the furnace or on top of the flue 9. The falling char is subjected to the action of a suitable heated gaseous medium for drying it and for also altering the carbon content thereof as desired, this medium being usually either heated air or heated carbon dioxid obtained in any usual manner. As the char is tumbled around in the drum by being caught up and spilled in showers by the flights the moisture in it is rapidly removed and the organic matter upon the surfaces and within the cells of the particles is either oxidized and driven off or reduced to carbon by the action of the oxidizing or reducing gas, and in the event that the latter is used there is a further addition of carbon due to the breaking up of the carbon dioxid and the depositing of its carbon content in and on the particles of char. During this period the temperature will of course be at a point sufficient to assure the proper carrying out of the process, the degree of heat depending upon the condition of the char under treatment and upon the nature of the treatment which it is to undergo. Of course suitable provision should be made for regulating the supply of the gaseous medium for altering the carbon content of the char, a valve of suitable construction being shown at 27 in a supply pipe, 28, leading into the casing-head 13. The outlet for the gaseous medium supplied through this pipe is indicated at 29. The action of this medium continues until in the course of its treatment the char reaches the delivery end of the drum 2 when it is discharged from the drum and may be received and carried away by a suitable conveyer, such as a feed-screw 30, working in a receiving trough, 31.

From the foregoing it is clear that in my improved apparatus for carrying out the Weinrich process of altering the carbon content of bone-black the char is dried, revivified and its carbon content altered as may be required by the action of a gaseous medium heated by internal heating means, that is to say, by a heater or furnace located within and practically inclosed by the outer drying chamber which is also a rotary drum with internal flights, so that substantially all of the heat given off by the furnace is utilized in the apparatus instead of being radiated into space and wasted to a large extent as is the case with drying apparatus for this purpose having external heating means. It will also be seen that the furnace and the inner or stationary chamber are both supported entirely independently of the outer or rotary drying chamber, so that the latter may be readily removed from or assembled with the other parts, and that in addition to this, though the rotary drum surrounds and lies at a different angle from the furnace and the stationary chamber, which latter elements are supported directly by the main frame-work, there is no interference with the rotation of the outer drum about the furnace and the stationary inner chamber. Further it will be clear that provision is made for compensating for longitudinal expansion and contraction of the inner drying chamber, and in general for all necessary movements of the parts either during operation or in assembling or disassembling when the apparatus is not in operation.

What I claim is:

1. In an apparatus for revivifying char, the combination with a rotary char-conveying drum of means including a furnace located entirely within the drum for passing a heating medium from the furnace through the drum, said means serving to retain the heating medium out of contact with the char in the drum, closures for the ends of the drum serving to completely inclose the furnace in the drum, and means associated with at least one of said closures to admit gaseous medium to the interior of the drum to alter the carbon content of the char.

2. In an apparatus for revivifying char, the combination with a rotary char-conveying drum of means including a furnace located entirely within the drum at the receiving end thereof for passing a heating medium from the furnace through the drum, said means serving to retain the heating medium out of contact with the char in the drum, closures for the ends of the drum serving to completely inclose the furnace in the drum, and means associated with at least one of said closures to admit gaseous medium to the interior of the drum to alter the carbon content of the char.

3. In an apparatus for revivifying char, the combination with a rotary char-conveying drum of means including a furnace located entirely within the drum at the receiving end thereof for passing a heating medium from the furnace through the drum, said means serving to retain the heating medium out of contact with the char in the drum, closures for the ends of the drum serving to completely inclose the furnace in the drum, and means associated with the closure at the discharge end of the drum for passing a gaseous medium through the drum in a direction opposite to the flow of said heating medium to alter the carbon content of the char.

4. In an apparatus for revivifying char, the combination with a rotary char-conveying drum mounted to turn about an axis disposed at an angle to the horizontal, of flights within the drum for lifting and showering said char in said drum, means including a furnace located entirely within the drum for passing a heating medium from the furnace through the drum, closures for the ends of the drum serving to completely inclose the furnace in the drum, and means associated with at least one of said closures for admitting a gaseous medium to the interior of the drum to alter the carbon content of the char.

5. In an apparatus for revivifying char, the combination with a rotary char-conveying drum mounted to turn about an axis disposed at an angle to the horizontal, of flights within the drum for lifting and showering the char in said drum, means including a stationary furnace located entirely within the drum for passing a heating medium from the furnace through the drum, closures for the ends of the drum serving to completely inclose the furnace in the drum, and means associated with at least one of said closures to admit gaseous medium to the interior of the drum to alter the carbon content of the char.

6. In an apparatus for revivifying char, the combination with a rotary char-conveying drum mounted to turn about an axis disposed at an angle to the horizontal, of a pair of casing heads for receiving the ends of the drum, means for showering said char in the drum, means including a furnace located entirely within the drum and completely inclosed by the drum and said casing heads for passing a heating medium through the drum, said means serving to retain the heating medium out of contact with the char in the drum, and means associated with the casing head at the discharge end of the drum for admitting a gaseous medium to the interior of the drum to alter the carbon content of the char.

7. In an apparatus for revivifying char, the combination with a rotary char-conveying drum of a drying chamber disposed within the same, means including a furnace located entirely within the drum for passing a heating medium through the interior of said heating chamber, said chamber serving to retain the heating medium out of contact with the char in the drum, closures for the ends of the drum serving to completely inclose the furnace in the drum, and means associated with at least one of said closures to admit gaseous medium to the interior of the drum to alter the carbon content of the char.

8. In an apparatus for revivifying char, the combination with a rotary char-conveying drum of a drying chamber disposed within the same, means including a furnace located entirely within the drum for passing a heating medium through the interior of said heating chamber, said chamber serving to retain the heating medium out of contact with the char in the drum, closures for the ends of the drum serving to completely inclose the furnace in the drum, and regulable means associated with at least one of said closures for admitting gaseous medium to the interior of the drum to alter the carbon content of the char.

Signed at New York in the county of New York and State of New York this 20th day of June A. D. 1913.

ROBERT S. KENT.

Witnesses:
C. S. CHAMPION,
ANNIE C. BARNES.